US012307396B2

(12) United States Patent
Flores et al.

(10) Patent No.: US 12,307,396 B2
(45) Date of Patent: *May 20, 2025

(54) OPTIMIZING USER TASK SCHEDULES IN A CUSTOMER RELATIONSHIP MANAGEMENT PLATFORM

(71) Applicant: American Express Travel Related Services Company, Inc., New York, NY (US)

(72) Inventors: Hector Flores, Phoenix, AZ (US); Abhishek Jain, Phoenix, AZ (US); Robin Jain, Phoenix, AZ (US); Yogaraj Jayaprakasam, Phoenix, AZ (US); Srinivas K. Kumandan, Chandler, AZ (US); Jordan Meyerowitz, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,413

(22) Filed: Jul. 22, 2022

(65) Prior Publication Data

US 2022/0358447 A1  Nov. 10, 2022

Related U.S. Application Data

(63) Continuation of application No. 16/282,734, filed on Feb. 22, 2019, now Pat. No. 11,416,791.

(51) Int. Cl.
*G06Q 10/00* (2023.01)
*G06F 17/18* (2006.01)
*G06Q 10/0631* (2023.01)

(52) U.S. Cl.
CPC ..... *G06Q 10/063116* (2013.01); *G06F 17/18* (2013.01); *G06Q 10/063114* (2013.01); *G06Q 10/06316* (2013.01)

(58) Field of Classification Search
None
See application file for complete search history.

(56) References Cited

U.S. PATENT DOCUMENTS 5,999,908 A * 12/1999 Abelow ............. G06Q 30/0203
434/118
6,697,824 B1 * 2/2004 Bowman-Amuah ........................
G06F 16/958
707/E17.116

(Continued)

OTHER PUBLICATIONS

Toubeau, Jean-François, et al. "Deep learning-based multivariate probabilistic forecasting for short-term scheduling in power markets." IEEE Transactions on Power Systems 34.2 (2018): 1203-1215. (Year: 2018).*

(Continued)

*Primary Examiner* — Gurkanwaljit Singh
(74) *Attorney, Agent, or Firm* — Thomas Horstemeyer, LLP

(57) ABSTRACT

Systems and methods for optimizing user task schedules in a customer relationship management (CRM) platform is disclosed. In one example, a system comprising a computing device and a cache. The computing device is configured to generate child user task schedules and calculate task win probabilities of tasks for the child user task schedules using a machine learning system. The machine learning system is used to determine the plurality of task win probabilities. The computing device is also configured to calculate total task win probabilities for the child user task schedules based on the task win probabilities and is configured to determine an optimized user task schedule by selecting a respective user (Continued)

task schedule having a greatest total task win probability from a subset of the plurality of child user task schedules stored in the distributed cache.

20 Claims, 4 Drawing Sheets

(56) References Cited

U.S. PATENT DOCUMENTS

| | | | |
|---|---|---|---|
| 6,985,872 B2* | 1/2006 | Benbassat | G06Q 10/06311 705/320 |
| 7,165,041 B1* | 1/2007 | Guheen | G06Q 30/0601 705/26.1 |
| 8,386,639 B1* | 2/2013 | Galvin | G06Q 10/06 705/7.14 |
| 9,128,995 B1* | 9/2015 | Fletcher | H04L 41/5038 |
| 10,225,136 B2* | 3/2019 | Bingham | G06F 16/248 |
| 10,248,653 B2* | 4/2019 | Blassin | G06N 20/00 |
| 10,346,444 B1* | 7/2019 | Heitman | G06Q 10/105 |
| 2001/0044099 A1* | 11/2001 | Rappaport | A61B 5/4824 434/323 |
| 2004/0034857 A1* | 2/2004 | Mangino | G06Q 10/0631 718/104 |
| 2004/0177002 A1* | 9/2004 | Abelow | G06Q 10/0639 705/14.19 |
| 2008/0002823 A1* | 1/2008 | Fama | H04M 3/5233 379/265.12 |
| 2008/0120129 A1* | 5/2008 | Seubert | G06Q 40/125 705/305 |
| 2010/0094878 A1* | 4/2010 | Soroca | G06F 16/9577 707/812 |
| 2010/0205541 A1* | 8/2010 | Rapaport | G06Q 30/02 715/753 |
| 2010/0332281 A1 | 12/2010 | Horvitz et al. | |
| 2011/0184771 A1* | 7/2011 | Wells | G06Q 10/063114 705/7.14 |
| 2011/0185363 A1 | 7/2011 | Hayashi | |
| 2012/0036455 A1* | 2/2012 | Holt | G06F 3/0482 715/764 |
| 2012/0215578 A1* | 8/2012 | Swierz, III | G06Q 50/205 705/7.14 |
| 2014/0040306 A1* | 2/2014 | Gluzman Peregrine | G06F 16/2477 707/769 |
| 2014/0101058 A1* | 4/2014 | Castel | G06Q 10/20 705/305 |
| 2014/0136443 A1* | 5/2014 | Kinsey, II | G06Q 10/1095 705/347 |
| 2014/0146961 A1* | 5/2014 | Ristock | H04M 3/5234 379/265.11 |
| 2014/0380139 A1* | 12/2014 | Mondri | G06F 40/18 715/212 |
| 2015/0154524 A1* | 6/2015 | Borodow | H04W 4/029 705/7.23 |
| 2015/0213512 A1* | 7/2015 | Spievak | G06Q 30/0275 705/14.71 |
| 2015/0215173 A1 | 7/2015 | Dutta et al. | |
| 2016/0162478 A1* | 6/2016 | Blassin | G06Q 10/063112 706/12 |
| 2017/0153925 A1 | 6/2017 | Shakya et al. | |
| 2017/0236081 A1* | 8/2017 | Grady Smith | G06Q 10/0637 705/7.36 |
| 2017/0337492 A1 | 11/2017 | Chen et al. | |
| 2018/0143975 A1* | 5/2018 | Casal | G06F 40/51 |
| 2019/0295018 A1* | 9/2019 | Borodow | H04M 15/84 |
| 2020/0210918 A1* | 7/2020 | Brand | G06Q 10/063116 |
| 2020/0210919 A1* | 7/2020 | Monovich | G06Q 10/087 |
| 2020/0210931 A1* | 7/2020 | Idan | G06N 5/04 |
| 2020/0210965 A1* | 7/2020 | Garber | G06N 5/04 |

OTHER PUBLICATIONS

Amin, Kareem, et al. "Dynamic process workflow routing using Deep Learning." International Conference on Innovative Techniques and Applications of Artificial Intelligence. Springer, Cham, 2018. (Year: 2018).*

Khmeleva, Elena. Evolutionary Algorithms for Scheduling Operations. Order No. 10671121 Sheffield Hallam University (United Kingdom), 2016 Ann Arbor (Year: 2016).*

Galitsky, Boris, and Josep Lluis de la Rosa. "Concept-based learning of human behavior for customer relationship management." Information Sciences 181.10 (2011): 2016-2035. (Year: 2011).*

Amin et al., "Dynamic process workflow routing using Deep Learning," In: Lecture Notes in Computer Science, vol. 11311, Springer, 2018, 12 pages.

Arya et al., "Child based Level-Wise List Scheduling Algorithm," I.J. Modern Education and Computer Science, vol. 9, 2017, pp. 24-31.

Galitsky et al., "Concept-based learning of human behavior for customer relationship management," Information Sciences, vol. 181, 2011, pp. 2016-2035.

Hasheminejad et al., "Data mining techniques for analyzing bank customers: A survey," Intelligent Decision Technologies, vol. 12, Jan. 2018, pp. 1-19.

Kaur et al., "An Efficient Approach to Genetic Algorithm for Task Scheduling in Cloud Computing Environment," International Journal of Information Technology and Computer Science, vol. 10, 2012, pp. 74-79.

Keramati et al., "Addressing Churn Prediction Problem with Meta-Heuristic, Machine Learning, Neural Network and Data Mining Techniques: A Case Study of a Telecommunication Company," International Journal of Future Computer and Communication, vol. 4, No. 5, Oct. 2015, pp. 350-357.

Keshanchi et al., "An improved genetic algorithm for task scheduling in the cloud environments using the priority queues: Formal verification, simulation, and statistical testing," Manuscript, Journal of Systems and Software, vol. 124, Jul. 2016, 45 pages.

Khmeleva, Elena, "Evolutionary Algorithms for Scheduling Operations," Thesis, ProQuest, Sep. 2016, 338 pages.

Toubeau et al., "Deep Learning-Based Multivariate Probabilistic Forecasting for Short-Term Scheduling in Power Markets," IEEE Transactions on Power Systems, vol. 34, No. 2, Mar. 2019, pp. 1203-1215.

* cited by examiner

OPTIMIZING USER TASK SCHEDULES IN A CUSTOMER RELATIONSHIP MANAGEMENT PLATFORM

CROSS REFERENCE TO RELATED APPLICATIONS

This application is a continuation of, claims priority to, and the benefit of, U.S. Ser. No. 16/282,734, filed Feb. 22, 2019 and entitled "OPTIMIZING USER TASK SCHEDULES IN A CUSTOMER RELATIONSHIP MANAGEMENT PLATFORM," which is incorporated by reference herein in its entirety.

FIELD

This disclosure generally relates to customer relationship management (CRM) platforms, and more specifically, to systems and methods for optimizing user task schedules in CRM platforms.

BACKGROUND

Companies may use a customer relationship management (CRM) platform to manage the company's relationships and interactions with customers, potential customers, end users, and similar parties. For example, company salespeople may interact with the CRM platform to review sales tasks. Salespeople may be assigned a substantial number of sales tasks during a defined time period, with various sales tasks being at different stages of completion and having different return on investment. The CRM platform may store and maintain a calendar for each salesperson comprising a user task schedule of assigned sales tasks scheduled into specific time slots. Typically, each individual salesperson (or manager) defines their own user task schedule, then manually assigns and inputs one or more sales tasks into time slots in the user task schedule. As such, the salesperson may not select, input, or prioritize sales tasks in the optimal order and/or in an optimal time slot in the user task schedule.

A technical problem is that repeated manual input requires the salesperson to perform additional computer functions, thus increasing data storage, memory, processing needs and processing usage. Further, due to the time sensitive nature of some sales tasks, typical task optimization techniques requiring human review or complex algorithms needing long processing times may not be effective in optimizing the user task schedule.

SUMMARY

Systems, methods, and articles of manufacture (collectively, the "system") for optimizing user task schedules in a customer relationship management (CRM) platform are disclosed. The system may generate a first user task schedule by inputting a task into a first time slot in a user schedule. The system may calculate a first total task win probability for the first user task schedule based on a task win parameter and a position of the first time slot. The system may generate a second user task schedule by inputting the task into a second time slot in the user schedule, wherein the second time slot is different from the first time slot. The system may calculate a second total task win probability for the second user task schedule based on the task win parameter and the position of the second time slot. The system may determine an optimized user task schedule by selecting the user task schedule having the greatest total task win probability.

In various embodiments, the task win parameter may comprise at least one of a user proficiency index, a task score, a task success rate, a task progress, or a textual parameter. The operation of calculating the (first and/or second) total task win probability may comprise calculating the user proficiency index based on user metadata associated with the user schedule, wherein the user metadata comprises sales proficiency data comprising at least one of a sales team assignment, a sales experience, or a sales performance metric. The operation of calculating the (first and/or second) total task win probability may comprise calculating the task score based on task metadata associated with the task, wherein the task metadata comprises at least one of business data, business contact data, a referral source, or a return volume. The operation of calculating the (first and/or second) total task win probability may comprise calculating the task success rate based on the task metadata associated with the task, wherein the task metadata comprises at least one of a business industry, a business state, a contact title, a time zone, or available business hours. The operation of calculating the (first and/or second) total task win probability may comprise determining the task progress based on the task metadata associated with the task, wherein the task progress comprises at least one of a dependent task, a task sequence, a next best action, or a task status. The operation of calculating the (first and/or second) total task win probability may comprise determining the textual parameter based on the task metadata associated with the task, where the textual parameter comprises at least one of weather, business stock, or business industry data.

The operation of calculating the (first and/or second) total task win probability may comprise applying a win parameter weight to at least one of the user proficiency index, the task score, the task success rate, the task progress, or the textual parameter. In response to the task progress being near completion, the win parameter weight may be applied to the task progress.

In various embodiments, the system may generate a child user task schedule by performing a genetic crossover analysis on a first user task schedule and a second user task schedule, wherein the first user task schedule is associated with a first total task win probability and the second user task schedule is associated with a second total task win probability. The system may calculate a child total task win probability for the child user task schedule based on a task win parameter. The system may generate a mutated child user task schedule by performing a genetic mutation analysis on the child user task schedule. The system may calculate a mutated child user task win probability for the mutated child user task schedule based on the task win parameter.

In various embodiments, the system may determine an optimized user task schedule by selecting the first user task schedule, the second user task schedule, the child user task schedule, or the mutated child user task schedule having the greatest task win probability. The system may perform the genetic crossover analysis by combining the first user task schedule and the second user task schedule to generate the child user task schedule to comprise a subset selection of task assignments from the first user task schedule and the second user task schedule. The system may generate a second child user task schedule by performing the genetic crossover analysis on the first user task schedule and the second user task schedule, wherein the second genetic crossover analysis generates the second child user task schedule different than the child user task schedule. The system may calculate a second child total task win probability for the second child user task schedule based on the task win parameter. The system may determine the child user task schedule having the greatest child total task win probability, wherein in response to the child total task win probability being greater than the second child total task win probability, the second child task schedule is discarded.

In various embodiments, the system may perform the genetic mutation analysis by moving a selected task from a first time slot in the child user task schedule to a second time slot in the child user task schedule to generate the mutated child user task schedule. The system may generate a second mutated child user task schedule by performing the genetic mutation analysis on the child user task schedule, wherein the second genetic mutation analysis generates the second mutated child user task schedule different than the mutated child user task schedule. The system may calculate a second mutated child total task win probability for the second mutated child user task schedule based on the task win parameter. The system may determine the mutated child user task schedule having the greatest mutated child total task win probability, wherein in response to the mutated child total task win probability being greater than the second mutated child total task win probability, the second mutated child task schedule is discarded.

In various embodiments, the system may evaluate the optimized user task schedule based on a task constraint, wherein the task constraint comprises logic to evaluate whether each task is assigned to a single time slot in the optimized user task schedule and whether each time slot comprises a single assigned task.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
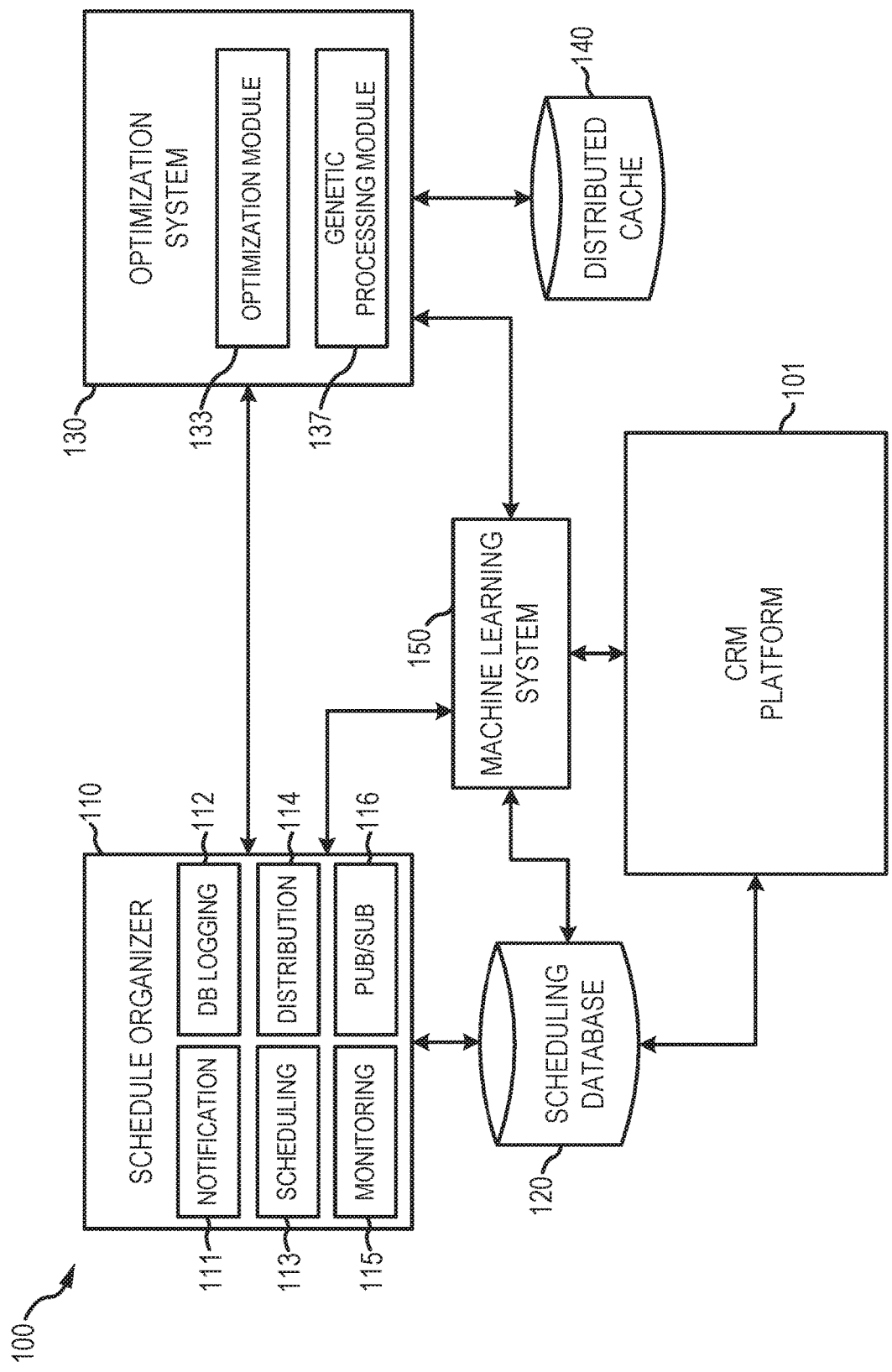
FIG. 1 is a block diagram illustrating a system for optimizing task schedules in a customer relationship management (CRM) platform, in accordance with various embodiments.

Systems for optimizing user task schedules in customer relationship management (CRM) platforms are disclosed. Users (e.g., business users, salespeople, support staff, etc.) may interact with the CRM platform to manage relationships and interactions with customers, potential customers, end users, and the like. For example, users may interact with the CRM platform to review a user task schedule of assigned tasks and user availability.

In various embodiments, the user task schedule may comprise a calendar for the user, indicating user availability and assigned tasks. For example, the user task schedule may comprise a daily schedule, a weekly schedule, a monthly schedule, or the like. The user task schedule may comprise various time slots for each day (e.g., a first time slot, a second time slot, etc.). Each time slot may comprise any desired time period such as, for example, 15 minutes, 30 minutes, 1 hour, etc. The time slots may be based on the working hours of the user such as, for example, Monday-Friday from 8:00 AM to 5:00 PM, with a 1-hour break from 12:00 PM to 1:00 PM. Each time slot may comprise an assigned task or user availability (e.g., no assigned task in a given time slot, "unavailable," etc.). Each user may be associated with various metrics and user metadata in the system. For example, the user metadata may comprise a user identifier (e.g., username, user ID, etc.), proficiency data (e.g., sales proficiency data, support proficiency data, etc.), a team assignment (e.g., a sales team assignment, an IT team assignment, a technology assignment, etc.), user experience (e.g., sales experience, technology background, duration of position, tenure, etc.), performance metrics (e.g., sales performance metrics, support resolution metrics, etc.), and/or the like.

In various embodiments, the task may comprise a sales task, sales lead, or the like assigned to the user. Each task may be formatted and generated to be compatible with the user task schedule, such that each task may be input into a time slot of the user task schedule, as discussed further herein. Each task may comprise or be associated with one or more parameters, task metadata, or the like. For example, the task metadata may comprise a task identifier (e.g., task ID, task name, etc.), a task stage (e.g., pending first contact, number of contacts, type of contacts, face-to-face meeting, near completion, etc.) or a task progress (e.g., a dependent task, a task sequence, a next best action, a task status, etc.). The task metadata may also comprise data regarding the business associated with the task such as, for example, business data, business industry, business city, state, or zip code, a business time zone, business hours, the referral source, an expected or potential return volume from sales, and/or the like. The task metadata may also comprise data regarding the point of contact with the business (e.g., business contact data) such as, for example, contact name, contact title, contact phone number, contact email address, or the like. In various embodiments, the task metadata may be manually (or via an autofill feature) generated during creation of each task.

In various embodiments, the task may comprise any other suitable task assigned to the user. For example, and in accordance with various embodiments, the task may comprise an information technology (IT) task, a support task, an issue management task, or the like. For example, the user may provide IT service or similar issue management for technology, infrastructure, business cases, or the like. The task metadata may comprise a user proficiency (e.g., number of issues or support tickets resolved, average time per a resolved ticket, total tenure of position, qualifications and background, technical expertise, etc.), a task priority, a task severity, a task impact, a detailed description, an issue sentiment, a resolution time, and/or the like.

In various embodiments, the system may optimize the assignment of tasks into time slots in the user task schedule. As discussed further herein, the system may dynamically track a user's progress on one or more assigned tasks, and optimally arrange the tasks into the user task schedule based on various task win parameters such as, for example, user proficiency, a calculated task score, a task success rate, a task progress, textual parameters, and/or the like. The system may also integrate optimization algorithms, meta-heuristic techniques (e.g., a genetic processing analysis), and/or machine learning and artificial intelligence processes to ensure further optimization of task assignments, as discussed further herein. Although discussed primarily herein with respect to sales tasks, the system may be configured to optimize task assignments into CRM platforms across different business organizations and task types.

The system may therefore provide a technical solution to the technical problem of needing repeated manual intervention and/or input to assign tasks into user task schedules. For example, by automating and optimizing the input of tasks into user task schedules (as opposed to the user manually inputting data), the user performs less computer functions and provides less input, which saves on data storage and memory which speeds processing. In various embodiments, the system may fetch metrics needed to plan the task for several users, and compute an optimal schedule for each of the users. In that regard, individual users do not need to look up details about the tasks when working through the user's schedule. The system may therefore reduce the need for manual queries into backend databases and repositories, thus decreasing the CPU processing time, memory, and data usages compared to typical systems.

In various embodiments, and with reference to FIG. 1, a system 100 for optimizing user task schedules in customer relationship management (CRM) platforms is disclosed. System 100 may comprise one or more of a CRM platform 101, a schedule organizer 110, a scheduling database 120, an optimization system 130, a distributed cache 140, and/or a machine learning system 150. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

CRM platform 101 may be in electronic communication with scheduling database 120 and/or machine learning system 150. CRM platform 101 may comprise any suitable combination of software, hardware, and/or database components. For example, CRM platform 101 may comprise software deployed on an application server, web server, or the like. CRM platform 101 may also be cloud-based and may be stored in an external, remote network available via an internet connection. CRM platform 101 may comprise any suitable type of customer relationship management product, platform, or software. For example, CRM platform 101 may be a SALESFORCE® CRM platform provided by SALESFORCE.COM of San Francisco, CA.

CRM platform 101 may include a CRM platform interface configured to provide a graphical user interface (GUI) accessible by various users. For example, CRM platform 101 may provide various software services for case management, task management, analytical tools, and/or other services. The CRM platform interface may be accessible via a web browser (e.g., GOOGLE CHROME®, MICROSOFT INTERNET EXPLORER®, etc.), a software application or plugin, a mobile application (e.g., downloaded via APPLE® APP STORE®, GOOGLE PLAY®, etc.), or the like. For example, in a SALESFORCE® CRM platform, the CRM platform interface may be the SALESFORCE® CHATTER™ interface.

CRM platform 101 may be configured to compile customer data across different channels of interactions, including, for example, telephone, chat, website, social media, and the like. For example, businesses may engage customers via CRM platform 101 throughout the customer lifecycle with the business. As a further example, the user may interact with CRM platform interface to input, access, and interact with various CRM data records, including, for example, task data, user data, user task schedules, and/or the like.

The data collected by CRM platform 101 may be stored in scheduling database 120 (e.g., a CRM database). Scheduling database 120 may comprise any suitable database or data structure capable of storing and maintaining CRM data records. The CRM data may be stored and associated with various metadata such as, for example, task metadata and user metadata, as previously discussed herein.

In various embodiments, schedule organizer 110 may be in electronic communication with scheduling database 120, optimization system 130, and/or machine learning system 150. Schedule organizer 110 may be configured as a central processing manager in system 100. In that regard, schedule organizer 110 may be configured to orchestrate operations to generate user task schedules, as discussed further herein. Schedule organizer 110 may comprise may comprise one or more hardware, software, and/or database components. For example, schedule organizer 110 may comprise one or more network environments, servers, computer-based systems, processors, databases, and/or the like. Schedule organizer 110 may comprise at least one computing device in the form of a computer or processor, or a set of computers/processors, although other types of computing units or systems may be used such as, for example, a server, web server, pooled servers, or the like. Schedule organizer 110 may also include software, such as services, APIs, and the like, configured to perform various operations discussed herein. In various embodiments, schedule organizer 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, schedule organizer 110 may comprise one or more modules or subcomponents configured to perform various operations in system 100. For example, schedule organizer 110 may comprise a notification module 111, a scheduling module 113, a monitoring module 115, a database logging module 112, a distribution module 114, and/or a publication/subscription module 116.

Notification module 111 may be configured to generate and transmit notification alerts to one or more parties (e.g., users, supervisors, staff, etc.) in system 100 in response to a user task schedule being generated and/or optimized. Notification module 111 may also be configured to generate and transmit error alerts in response to system 100 encountering an error during the generation and/or optimization of user task schedules.

Database logging module 112 may be configured to perform various internal database operations. For example, database logging module 112 may perform asynchronous services to log execution of each operational step during generation and optimization of user task schedules.

Scheduling module 113 may be configured to execute the optimization operations discussed further herein. For example, scheduling module 113 may be configured to execute optimization operations based on a user preference, in batch, and/or during any suitable or defined time period (e.g., daily, weekly, monthly, etc.). In various embodiments, scheduling module 113 may also be configured to execute the optimization operations in response to being invoked by a manual request for optimization.

Distribution module 114 may be configured to distribute user task schedules to CRM platform 101 and/or directly to user's associated with the user task schedule, Distribution module 114 may distribute the user task schedules daily, weekly, monthly, or at any other suitable or defined time period.

Monitoring module 115 may be configured to monitor the generation and optimization of user task schedules in system 100. Monitoring module 115 may also be configured to gather data during the end-to-end process flow to detect errors and ensure the operations are being executed correctly.

Publication/subscription module 116 may be configured to subscribe to data from scheduling database 120 and/or publish data to scheduling database 120 or optimization system 130. In that regard, publication/subscription module 116 may retrieve user data, task data, user schedules, or the like from scheduling database 120 during generation and optimization of user task schedules. Publication/subscription module 116 may also publish user task schedules to optimization system 130 to perform additional optimization operations, as discussed further herein.

In various embodiments, optimization system 130 may be in electronic communication with schedule organizer 110, distributed cached 140, and/or machine learning system 150. Optimization system 130 may comprise one or more hardware, software, and/or database components. For example, optimization system 130 may comprise one or more network environments, servers, computer-based systems, processors, databases, and/or the like. Optimization system 130 may comprise at least one computing device in the form of a computer or processor, or a set of computers/processors, although other types of computing units or systems may be used such as, for example, a server, web server, pooled servers, or the like. Optimization system 130 may also include software, such as services, APIs, and the like, configured to perform various operations discussed herein. In various embodiments, optimization system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Machine learning system 150 may be in electronic communication with CRM platform 101, schedule organizer 110, scheduling database 120, and/or optimization system 130. In various embodiments, machine learning system 150 may comprise a software implementation configured to perform various operations, as discussed further herein. For example, machine learning system 150 may comprise a REST API, web service, or the like. In various embodiments, machine learning system 150 may comprise any suitable combination of hardware, software, and/or database components. For example, machine learning system 150 may comprise one or more network environments, servers, computer-based systems, processors, databases, and/or the like. Machine learning system 150 may comprise at least one computing device in the form of a computer or processor, or a set of computers/processors, although other types of computing units or systems may be used such as, for example, a server, web server, pooled servers, or the like. Machine learning system 150 may also include one or more data centers, cloud storages, or the like, and may include software, such as APIs, services, or the like, configured to perform various operations discussed herein. In various embodiments, machine learning system 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, machine learning system 150 may implement various artificial intelligence, machine learning, and/or statistical analysis techniques to aid in various calculations and operations discussed herein. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. For example, and in accordance with various embodiments, machine learning system 150 may implement machine learning algorithms and models to aid in calculating or determining a user proficiency index, a task score, a task success rate, a task progress, a textual parameter, a task win probability, or the like, as discussed further herein.

Machine learning system 150 may implement any suitable machine learning model or algorithm, statistical data model, or the like, and may be supervised or unsupervised. For example, exemplary unsupervised models may include clustering and dimensionality reduction, LDA topic modeling, and/or any other unsupervised machine learning model. For example, exemplary supervised models may include classification models, regression models, sentiment analysis techniques, and/or any other supervised machine learning model. The machine learning model may be trained (e.g., using historical data correlated to various task scores, task success rates, textual parameters, task win probability, etc.) to aid in weighting various variables and parameters to calculate or determine the user proficiency index, the task score, the task success rate, the task progress, the textual parameter, and/or the task win probability, as discussed further herein. In various embodiments, machine learning networks and/or subject matter experts may initially supervise the model and identify words and phrases that should be weighted more or less. In various embodiments, the machine learning model may comprise random forest models, gradient boosting models, or any other suitable or desired model. In various embodiments, machine learning system 150 may also implement reinforcement learning techniques to enhance the machine learning algorithm and/or statistical data models.

Optimization system 130 may be configured to perform various optimization operations on user task schedules, as discussed further herein. For example, optimization system 130 may be configured to generate user task schedules and perform various genetic processing analysis. Optimization system 130 may comprise various modules, services, or the like configured to aid in optimizing user task schedules. For example, optimization system 130 may comprise an optimization module 133 and/or a genetic processing module 137. In various embodiments, optimization module 133 and/or genetic processing module 137 may be exposed to system 100 components as stateless micro-services.

Optimization module 133 may be configured to distribute tasks into various time slots in each user schedule, calculate task win probabilities, and/or the like, as discussed further herein. For example, optimization module 133 may generate a user task schedule by inserting a first task into a first time slot, a second task into a second time slot, etc. Optimization module 133 may be configured to perform various operations to calculate task win probabilities to determine the generated user task schedule having the greatest total task win probability. For example, and in accordance with various embodiments, optimization module 133 may calculate the task win probabilities based on one or more task win parameters. The task win parameters may comprise, for example, a user proficiency index, a task score, a task success rate, a task progress, a textual parameter, and/or any other desired parameter indicative of success of a specific task, as discussed further herein.

Genetic processing module 137 may be configured to perform various genetic processing analysis, such as, for example a genetic crossover analysis, a genetic mutation analysis, and/or the like. The genetic processing analysis may be performed on user task schedules to further improve and optimize task placement into the user task schedules. For example, genetic processing module 137 may instantiate various meta-heuristic algorithms to complete the analysis, such as, a genetic crossover algorithm, a genetic mutation algorithm, and/or the like. For example, genetic processing module 137 may execute the genetic crossover algorithm to combine one or more task assignments from the first user task schedule and the second user task schedule to generate a child user task schedule, as discussed further herein. For example, genetic processing module 137 may execute the genetic mutation algorithm to move a selected task from a first time slot to a second time slot in a user task schedule to generate a mutated child user task schedule, as discussed further herein.

In various embodiments, distributed cache 140 may be configured to store a population of user task schedules during genetic processing analysis, as discussed further herein. Distributed cache 140 may comprise any suitable cache, database, data structure, or the like capable of storing and maintaining data. By storing the population of user task schedules during genetic processing analysis, distributed cache 140 may decrease redundant processing needs in system 100 and may enable faster generation and optimization of user task schedules.

Figure 2:
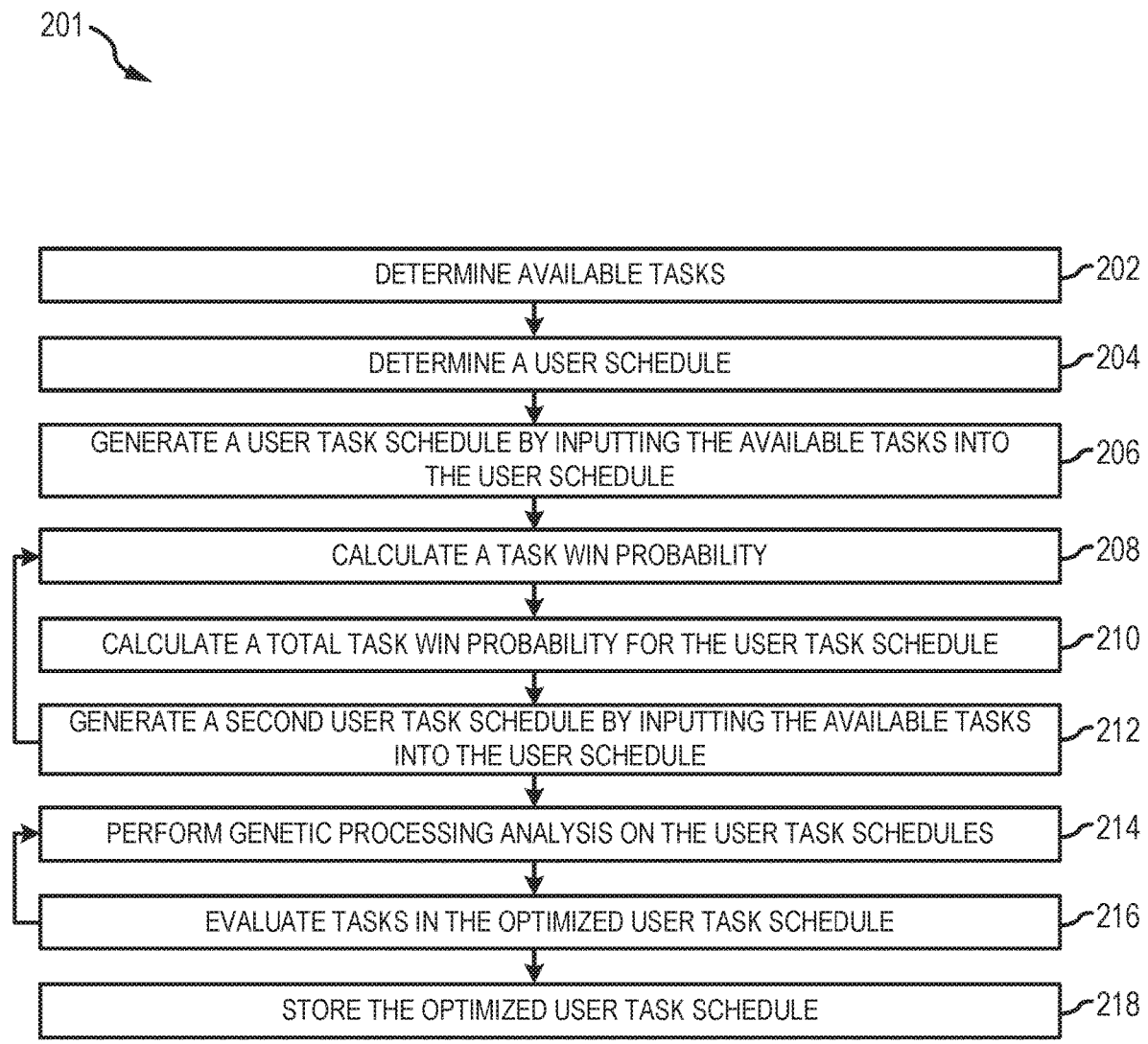
FIG. 2 illustrates a process flow for a method of optimizing a user task schedule in a CRM platform, in accordance with various embodiments.
Figure 3:
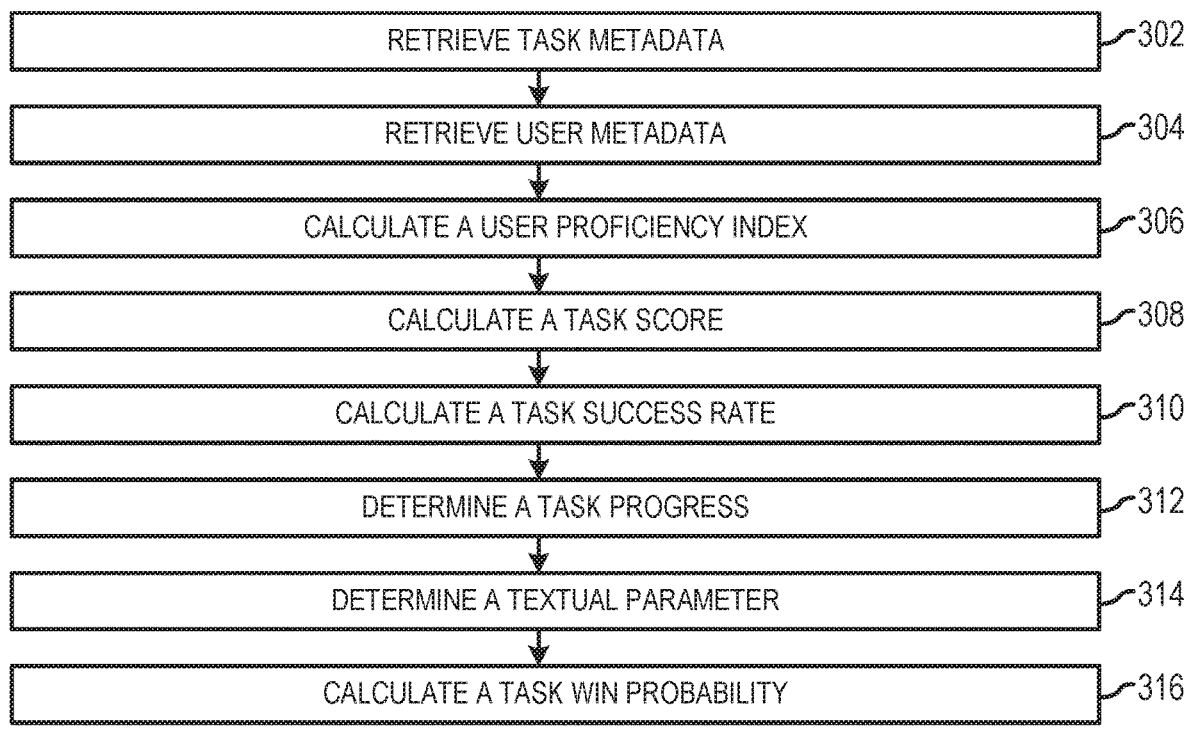
FIG. 3 illustrates a process flow for a method of calculating a task win probability, in accordance with various embodiments.
Figure 4:
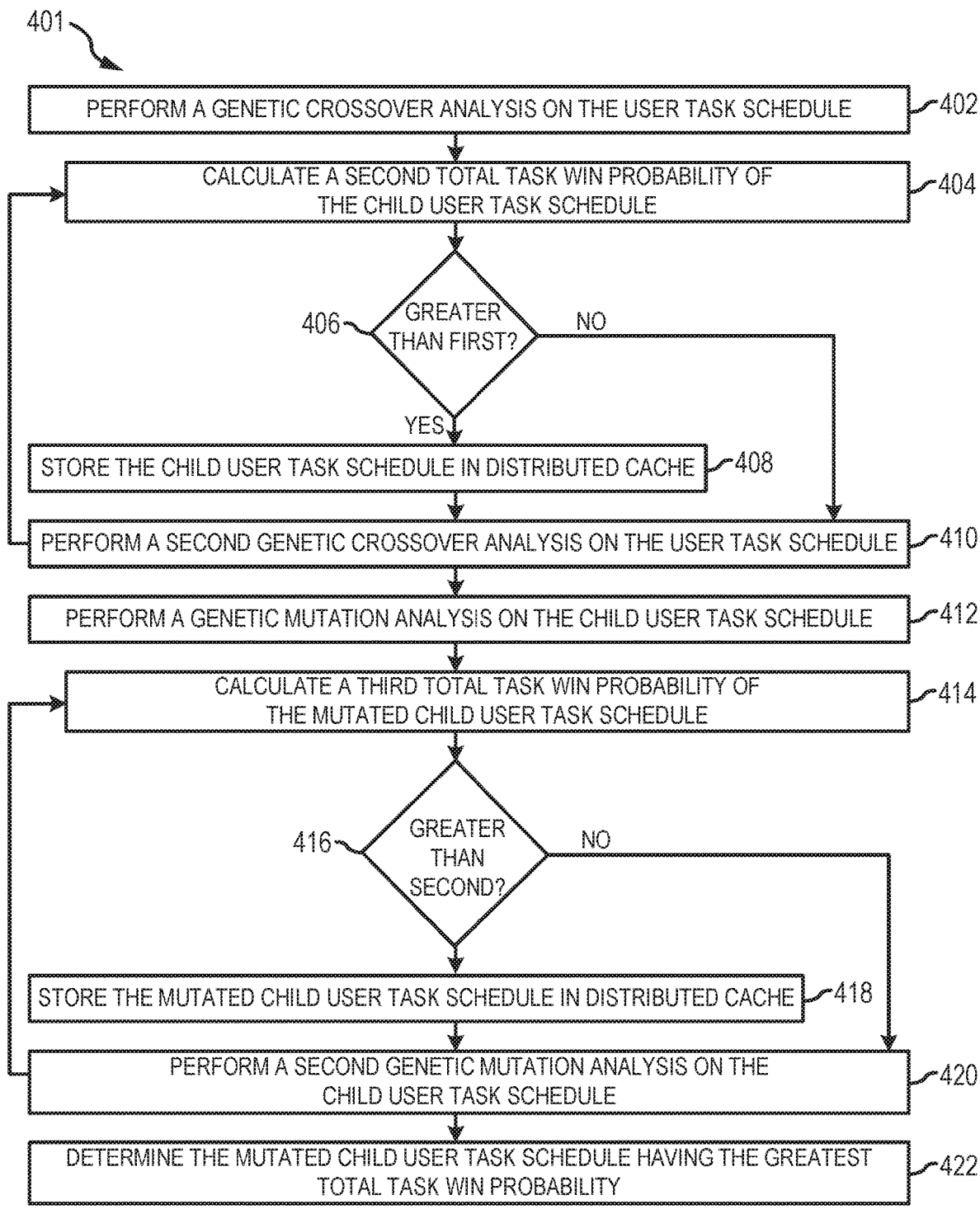
FIG. 4 illustrates a process flow for a method of genetic processing of user task schedules, in accordance with various embodiments.

Referring now to FIGS. 2-4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIGS. 2-4, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 2, and in accordance with various embodiments, a process 201 for optimizing a user task schedule in a customer relationship management (CRM) platform is disclosed. Process 201 may include determining available tasks (step 202) for a user. For example, schedule organizer 110 may query scheduling database 120 to retrieve the tasks assigned to the user (e.g., based on a user identifier associated with the user). Process 201 may include determining a user schedule (step 204) for the user. For example, schedule organizer 110 may query scheduling database 120 to retrieve the user schedule associated with the user (e.g., based on the user identifier).

In response to retrieving the tasks and the user schedule, process 201 may include generating a (first) user task schedule by inputting the available tasks into the user schedule (step 206). For example, schedule organizer 110 may invoke optimization system 130 by transmitting the tasks and/or the user schedule to optimization system 130. In response to being invoked, optimization system 130, via optimization module 133, may generate the user task schedule by inputting one or more available tasks into each available time slot in the user schedule.

Process 201 may include calculating a task win probability (step 208) for each task in the user task schedule. The task win probability may comprise data, a score, or the like configured to represent a probability that the task will be completed successfully. For example, the task win probability may comprise a scoring range (e.g., 0-100, 0-1, etc.), a letter grade (e.g., A, B, C, D, F), a percentage (e.g., 0%-100%), and/or the like. Optimization system 130 may invoke machine learning system 150 to calculate the task win probability. Machine learning system 150 may calculate the task win probability using any suitable method. For example, in accordance with various embodiments and with reference to FIG. 3, a process 301 for calculating a task win probability is disclosed.

Process 301 may include retrieving task metadata (step 302) based on the task. For example, machine learning system 150 may retrieve the task metadata from scheduling database 120 based on a task identifier associated with the task, and/or via any other suitable method. Process 301 may include retrieving user metadata (step 304) based on the user. For example, machine learning system 150 may retrieve the user metadata from scheduling database 120 based on the user identifier associated with the user, and/or via any other suitable method.

Process 301 may include calculating one or more task win parameters based on the retrieved task metadata and user metadata, and/or any other suitable data points. The task win parameters may be used to calculate the task win probability, as discussed further herein. Each task win parameter may comprise a function, machine learning algorithm, or the like dependent on the time slot of the user task schedule that the task is assigned to. For example, a machine learning model, statistical analysis, or similar big data analysis may be used to inform how the task win parameters change (negatively or positively) based on placement of the task in various time slots of the user task schedule. In that regard, the task win parameters may be configured to indicate whether an assigned task is likely to be successful, based at least partially on the assigned time slot and/or the user completing the task.

For example, and in accordance with various embodiments, process 301 may include calculating a user proficiency index (step 306). The user proficiency index may be configured to indicate the work proficiency, experience, and the like of the user associated with the user task schedule. In that regard, the user proficiency index may be calculated by machine learning system 150 based on various data points from the user metadata such as, for example, a sales team assignment, a sales experience, a sales performance metric, and/or the like. Machine learning system 150 may also communicate with CRM platform 101 directly to retrieve user metadata, such as, for example, daily calls performed, the average daily talk time on the calls, the number of follow-up conversations with a prospective sales lead, and/or the like. In that respect, machine learning system 150 may also gather data associated with a user's performance, such as a total number of leads worked on, the number of leads closed with a win (e.g., the lead becomes a client), and/or the like. Machine learning system 150 may implement various statistical modeling techniques to determine the impact each retrieved data point may have on the user's individual performance (e.g., user proficiency). For example, machine learning system 150 may analyze one or more of the data points to identify whether each data point had a positive or negative impact on the user's individual performance. As a further example, machine learning system 150 may determine the amount of the positive or negative impact each data point has on the user's individual performance, and weigh each data point accordingly. The user proficiency index may comprise a weighted sum of each data point, in accordance with the relative importance of each data point as determined by machine learning system 150.

As an example, machine learning system 150 may determine that the sales experience metric is positively correlated to the user's proficiency. A first user may have a high value for the sales experience metric (e.g., 25 year experience). Machine learning system 150 may assign the first user a value of +1 for the sales experience metric. The values of each metric for the first user may be combined to determine the first user's proficiency index. A second user may have a low value for the sales experience metric (e.g., 6 month experience). Machine learning system 150 may assign the first user a value of +1 for the sales experience metric. The values of each metric for the second user may be combined to determine the second user's proficiency index.

As a further example, and in various embodiments, process 301 may include calculating a task score (step 308). The task score may be configured to indicate the priority of the task, based on details of the business associated with the task. In that regard, the task score may be calculated by machine learning system 150 based on various data points from the task metadata such as, for example, business data, business contact data, a referral source, expected return volume, and/or the like. For example, machine learning system 150 may implement a machine learning model, such as a long short term memory network, to train a deep learning model using the various data points from the task metadata. The trained deep learning model may be used to estimate the probability of closing a task with a win at a given time slot (e.g., a probability value closer to 1 may indicate that the task is close to a win, a probability value closer to 0 may indicated that the task is close to a loss, etc.), based on the identified data points from the task metadata.

As a further example, and in various embodiments, process 301 may include calculating a task success rate (step 310). The task success rate may be configured to indicate the odds of a task succeeding based on the time slot assigned to contact the task contact associated with the task. For example, the task success rate may be used to estimate the probability that a given task contact will converse with the salesperson for a minimum amount of time for a given time slot. The task success rate may be calculated by machine learning system 150 based on the task metadata such as, for example, the business industry, the business state, the contact title, the business time zone, the business working hours, and/or the like. For example, the task success rate may be defined as a ratio between the total number of calls associated with one of the task metadata that was longer than a predefined minimum amount of time (e.g., two minutes), and the total number of calls made in the given task metadata. For example, wherein the task metadata comprise the retail industry in the state of Florida that total number of calls made at 9:00 AM EST may be 100. In response to the total number of calls lasting longer than the predefined minimum amount of time (e.g., two minutes) being 20, machine learning system 150 may calculate the task success rate for that time slot with the associated task metadata as 20%. In various embodiments, machine learning system 150 may factor in statistical accuracy of the results when calculating the task success rate. For example, statistical accuracy may consist (but is not limited to), estimating the statistical difference between the task success rates of two different task metadata segmentations (e.g. Florida retail at 9 am vs. Florida restaurant at 9 am).

As a further example, and in various embodiments, process 301 may include determining a task progress (step 312). The task progress may comprise data tracking the current progress of the task. In that respect, the task progress may be configured to provide data indicating the likelihood of the task succeeding based on the current progress of the task. The task progress may be determined by machine learning system 150 based on the task metadata such as, for example, a dependent task, a task sequence, a next best action, a task status, or the like. In various embodiments, machine learning system 150 may also be configured to receive an event log from CRM platform 101. The event log may comprise data such as, for example, a success rate of the time slots in which previous tasks were assigned and performed, the current stage of a task defined by the user, a client score (e.g., based on generic firmographic data), external textual information, or the like. In various embodiments, the event log may be structured as a string of text information (e.g., "Call at 8 am on a Wednesday in October Success Rate is 2%"; "Call at 4 pm on a Friday in December Success Rate is 2%"; etc.). Based on the task metadata and/or the event log, machine learning system 150 may implement a machine learning model, such as a long short term memory network, to train a deep learning model. The trained deep learning model may be used to estimate the probability of closing a task with a win at a given time slot (e.g., a probability value closer to 1 may indicate that the task is close to a win, a probability value closer to 0 may indicated that the task is close to a loss, etc.), based on the task metadata and/or event log.

As a further example, and in various embodiments, process 301 may include determining a textual parameter (step 314). The textual parameter may be configured to provide data indicating the likelihood of an external event associated with the business effecting the success of the task. In that regard, the textual parameter may be determined by machine learning system 150 based on weather, business stock, business industry data, and/or the like associated with the business defined in the task. For example, based on the textual parameter machine learning system 150 may implement a machine learning model, such as a long short term memory network, to train a deep learning model. The trained deep learning model may be used to estimate the probability of closing a task with a win at a given time slot (e.g., a probability value closer to 1 may indicate that the task is close to a win, a probability value closer to 0 may indicated that the task is close to a loss, etc.), based on the textual parameter.

Process 301 may include calculating the task win probability (step 316) of an available task based on at least one of the task win parameters. In various embodiments, machine learning system 150 may apply a weight to one or more of the task win parameters during calculating of the task win probability. One or more of the task win parameters may be assigned a weight having any desired value. For example, in response to the task progress being near completion, optimization system 130 may assign the task progress a "high" weight to cause the task progress to have a greater effect on the outcome of the task win probability. Machine learning system 150 may transmit the task win probability to optimization system 130 (e.g., to determine the optimal configuration of tasks assigned to the user).

With reference again to FIG. 2, process 201 may include calculating a total task win probability for the user task schedule (step 210). Optimization system 130 may calculate the total task win probability by calculating the sum of task win probabilities for each task assigned in the user task schedule.

Process 201 may include generating a second user task schedule by inputting the available tasks into the user schedule (step 212). The second user task schedule may be generated similar to the (first) user task schedule, with reference to step 206. The second user task schedule may be different than the (first) user task schedule (e.g., at least one available task is input into a different time slot in the user schedule). In that regard, process 201 may also include calculating a task win probability for each task assigned in the second user task schedule (e.g., similar to step 208), and calculating a second total task win probability for the second user task schedule (e.g., similar to step 210). In various embodiments, process 201 may also comprise generating any other suitable or desired number of user task schedules (e.g., a third user task schedule, a fourth user task schedule, etc.).

Process 201 may include performing a genetic processing analysis on the user task schedules (step 214). The genetic processing analysis may comprise one or more meta-heuristic algorithms configured to further optimize the user task schedules. Optimization system 130, via genetic processing module 137, may be configured to perform the genetic processing analysis. For example, in accordance with various embodiments and with reference to FIG. 4, a process 401 for genetic processing of user task schedules is disclosed. In response to being invoked by schedule organizer 110, optimization system 130, via genetic processing module 137, may be configured to instantiate one or more genetic processing algorithms, such as, for example a genetic crossover algorithm, a genetic mutation algorithm, and/or the like.

Process 401 may include performing a genetic crossover analysis on the user task schedules (step 402). Optimization system 130 may perform the genetic crossover analysis by combining one or more task assignments from the first user task schedule and the second user task schedule to generate a child user task schedule. In that regard, the child user task schedule may comprise a subset selection of task assignments from the first user task schedule and the second user task schedule. For example, a first user task schedule may comprise a first task in a first time slot and a second task in a second time slot. A second user task schedule may comprise the first task in a third time slot and the second task in a fourth time slot. The genetic crossover analysis may be performed by optimization system 130 to generate a child user task schedule comprising the first task in the first time slot and the second task in the fourth time slot. In that regard, the child user task schedule may comprise at least one task assignment for each parent user task schedule (e.g., the first user task schedule and the second user task schedule).

In various embodiments, process 401 may include calculating a second total task win probability of the child user task schedule (step 404). The second total task win probability may be calculated by optimization system 130 similar to the calculation of the (first) total task win probability, as discussed in steps 208 and 210, with brief reference to FIG. 2. Process 401 may include determining whether the second total task win probability of the child user task schedule is greater than, less than, or equal to the total task win probability of the user task schedule (step 406). In that regard, optimization system 130 may compare the total task win probabilities to determine whether the child user task schedule improves the total task win probability of the parent user task schedules. In response to the second total task win probability of the child user task schedule being greater than the total task win probability of the user task schedule, process 401 may include storing the child user task schedule in distributed cache 140 (step 408). In response to optimization system 130 storing the child user task schedule in distributed cache 140, process 401 may include performing a second genetic crossover analysis on the user task schedule (step 410). The second genetic crossover analysis may be performed by optimization system 130 similar to the (first) genetic crossover analysis (e.g., step 402) and may also include calculating additional total task win probabilities for each child user task schedule (e.g., step 404).

In response to the second total task win probability of the child user task schedule being less than or equal to the total task win probability of the user task schedule, process 401 may include performing a second genetic crossover analysis on the user task schedule (step 410). Optimization system 130 may discard the child user task schedule having a total task win probability that did not improve on the user task win probabilities of the parent user task schedules. The second genetic crossover analysis may be performed by optimization system 130 similar to the (first) genetic crossover analysis (e.g., step 402) and may also include calculating additional total task win probabilities for each child user task schedule (e.g., step 404).

In that regard, process 401 may iterate performing the genetic crossover analysis by continuing to store child user task schedules that improve on the total task win probability of the parent user task schedules, and discard child user task schedules that do not improve on the total task win probability of the parent user task schedules.

In various embodiments, process 401 may include performing a genetic mutation analysis on the child user task schedule (step 412). Optimization system 130 may retrieve the child user task schedule from distributed cache 140. Optimization system 130 may perform the genetic mutation analysis by moving a selected task from a first time slot to a second time slot to generate a mutated child user task schedule. In various embodiments, optimization system 130 may be configured to randomly select one or more of selected tasks for mutation.

Process 401 may include calculating a third total task win probability of the mutated child user task schedule (step 414). The third total task win probability may be calculated by optimization system 130 similar to the calculation of the (first) total task win probability, as discussed in steps 208 and 210, with brief reference to FIG. 2. Process 401 may include determining whether the third total task win probability of the mutated child user task schedule is greater than, less than, or equal to the second total task win probability of the child user task schedule (step 416). In that regard, optimization system 130 may compare the total task win probabilities to determine whether the mutated child user task schedule improves the total task win probability of the child user task schedules. In response to determining that the third total task win probability of the mutated child user task schedule is greater than the second total task win probability of the child user task schedule, process 401 may include storing the mutated child user task schedule in distributed cache 140 (step 418). In response to optimization system 130 storing the mutated child user task schedule, process 401 may include performing a second genetic mutation analysis on the child user task schedule (step 420). The second genetic mutation analysis may be performed by optimization system 130 similar to the (first) genetic mutation analysis (e.g., step 412) and may also include calculating additional total task win probabilities for each mutated child user task schedule (e.g., step 414).

In response to determining that the third total task win probability of the mutated child user task schedule is less than or equal to the second total task win probability of the child user task schedule, process 401 may include performing a second genetic mutation analysis on the child user task schedule (step 420). Optimization system 130 may discard the mutated child user task schedule having a total task win probability that did not improve on the child user task win probability. The second genetic mutation analysis may be performed by optimization system 130 similar to the (first) genetic mutation analysis (e.g., step 412) and may also include calculating additional total task win probabilities for each mutated child user task schedule (e.g., step 414).

In various embodiments, process 401 may comprise continuing the genetic processing analysis (e.g., the genetic crossover analysis and the genetic mutation analysis) for any suitable or desired period of time or number of permutations. For example, the number of permutations or the desired period of time may be user defined, and/or may be based on the number of generated child user task schedules, the number of (parent) user task schedules received, and/or the like.

Process 401 may include determining the mutated child user task schedule having the greatest total task win probability (step 422). For example, optimization system 130 may poll distributed cache 140 to compare the total task win probabilities of each user task schedule stored in distributed cache 140. In response to determining the mutated child user task schedule having the greatest total task win probability, optimization system 130 may transmit that user task schedule (e.g., the optimized user task schedule) to machine learning system 150.

With reference again to FIG. 2, process 201 may include evaluating the tasks in the optimized user task schedule (step 216). For example, schedule organizer 110 and/or optimization system 130 may evaluate the tasks according to a task constraint. For example, the task constraint may comprise logic requiring that a single task be input into each time slot, that only one instance of a task can be included in each a user task schedule, and/or the like. In various embodiments, schedule organizer 110 and/or optimization system 130 may evaluate the tasks in the user task schedules after (or during) each generation of a new user task schedule to ensure that the tasks are correctly input into available time slots (e.g., after generation of each user task schedule, each genetic processing analysis, etc.).

Process 201 may include storing the optimized user task schedule (step 218). For example, machine learning system 150 may store the optimized user task schedule in scheduling database 120. Machine learning system 150 may also transmit the optimized user task schedule to CRM platform 101. In that regard, in response to receiving the optimized user task schedule CRM platform 101 may load the optimized user task schedule for user review and interaction.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system. For example, and in accordance with various embodiments, the components of system 100 may be in direct electronic communication with each other via a bus, network, and/or the like.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS' applications but have been combined for simplicity.

In various embodiments, components, modules, and/or engines of system 100, or one or more subcomponents of system 100, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX' operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, U.S. application Ser. No. 16/052,416 titled PROCUREMENT SYSTEM USING BLOCKCHAIN and filed on Aug. 1, 2018, U.S. application Ser. No. 16/054,185 titled BLOCKCHAIN-ENABLED DATASETS SHARED ACROSS DIFFERENT DATABASE SYSTEMS and filed on Aug. 3, 2018, U.S. application Ser. No. 16/168,477 titled MULTI-MERCHANT LOYALTY POINT PARTNERSHIP and filed on Oct. 23, 2018, U.S. application Ser. No. 16/217,654 titled PEER-TO-PEER CONFIDENTIAL DOCUMENT EXCHANGE and filed on Dec. 12, 2018, U.S. application Ser. No. 16/217,734 titled ZERO-KNOWLEDGE PROOF PAYMENTS USING BLOCKCHAIN and filed on Dec. 12, 2018, U.S. application Ser. No. 16/220,235 titled TRANSACTION ACCOUNT DATA MAINTENANCE USING BLOCKCHAIN and filed on Dec. 14, 2018, and U.S. application Ser. No. 16/239,017 titled HYBRID IDENTITY AS A SERVICE FOR DECENTRALIZED BROWSER BASED WALLER and filed on Jan. 3, 2019, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set.

As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 100, including in one or more databases, may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method comprising:
    training, by a processor, a long short-term memory network of a machine learning system using at least an event log received from a customer relationship management platform, training the long short-term memory network comprises generating a plurality of trained parameters for calculating a respective task win probability;
    determining, by the processor, a task success for each of a plurality of previous tasks based at least in part on the event log;
    generating, by the processor, a plurality of child user task schedules based at least in part on a first user task schedule from a plurality of user task schedules and a second user task schedule from the plurality of user task schedules, the first user task schedule and the second user task schedule each having a plurality of tasks and each task being assigned a respective time slot;
    calculating, by the processor, a plurality of task win probabilities of the plurality of tasks at the respective time slot using the machine learning system, the machine learning system using the long short-term memory network with the plurality of trained parameters to determine the plurality of task win probabilities based at least in part on task metadata associated with the plurality of tasks;
    determining, by the processor, a task progress for each of the plurality of tasks based at least in part on the task metadata;
    calculating, by the processor, a plurality of total task win probabilities for the plurality of child user task schedules based at least in part on the plurality of task win probabilities, the task progress for each of the plurality of tasks, and the task success for each of the plurality of previous tasks;
    determining, by the processor, an optimized user task schedule by selecting a respective user task schedule having a greatest total task win probability from a subset of the plurality of child user task schedules stored in a distributed cache;

transmitting, by the processor, the optimized user task schedule to the customer relationship management platform, the optimized user task schedule being accessible for display to a client device via a user interface of the customer relationship management platform; and transmitting, by the processor, an alert notification to the client device associated with a user identifier in response to determining the optimized user task schedule, the alert notification indicating the determination of the optimized user task schedule at the customer relationship management platform.

2. The method of claim 1, wherein the subset of the plurality of child user task schedules are stored in the distributed cache based at least in part on a first respective total task win probability of a first child user task schedule being greater than a second respective total task win probability of a second child user task schedule.

3. The method of claim 2, wherein the subset of the plurality of child user task schedules is a first subset of the plurality of child user task schedules, and further comprising:

disregarding a second subset of the plurality of child user task schedules from the distributed cache.

4. The method of claim 1, further comprising:

tracking, by the processor, a current task progress of a respective task using the machine learning system based at least in part on the event log received from the customer relationship management platform.

5. The method of claim 1, wherein selecting the respective user task schedule having the greatest total task win probability further comprises:

polling from the subset of the plurality of child user task schedules stored in the distributed cache in order to compare a respective total task win probability for each of the plurality of child user task schedules.

6. The method of claim 1, wherein the machine learning system retrieves the task metadata from a scheduling database based at least in part on a task identifier associated with a respective task.

7. The method of claim 1, wherein calculating the plurality of task win probabilities of the plurality of tasks at the respective time slot using the machine learning system further comprises estimating a probability of closing a respective task with a win at the respective time slot.

8. A system comprising:

a computing device comprising a processor;

a distributed cache; and machine-executable instructions stored in a memory that, in response to execution by the processor, cause the computing device to at least:

train a long short-term memory network of a machine learning system using at least an event log received from a customer relationship management platform;

determine a task success for each of a plurality of previous tasks based at least in part on the event log;

generate a plurality of child user task schedules based at least in part on a first user task schedule from a plurality of user task schedules and a second user task schedule from the plurality of user task schedules, the first user task schedule and the second user task schedule each having a plurality of tasks and each task being assigned a respective time slot;

calculate a plurality of task win probabilities of the plurality of tasks at the respective time slot using the machine learning system, the machine learning system using the long short-term memory network to determine the plurality of task win probabilities based at least in part on task metadata associated with the plurality of tasks;

determine a task progress for each of the plurality of tasks based at least in part on the task metadata;

calculate a plurality of total task win probabilities for the plurality of child user task schedules based at least in part on the plurality of task win probabilities, the task progress for each of the plurality of tasks, and the task success for each of the previous tasks;

determine an optimized user task schedule by selecting a respective user task schedule having a greatest total task win probability from a subset of the plurality of child user task schedules stored in the distributed cache;

transmit the optimized user task schedule to the customer relationship management platform, the optimized user task schedule being accessible for display to a client device via a user interface of the customer relationship management platform; and transmit an alert notification to the client device associated with a user identifier in response to determining the optimized user task schedule, the alert notification indicating the determination of the optimized user task schedule at the customer relationship management platform.

9. The system of claim 8, wherein the subset of the plurality of child user task schedules are stored in the distributed cache based at least in part on a first respective total task win probability of a first child user task schedule being greater than a second respective total task win probability of a second child user task schedule.

10. The system of claim 9, wherein the subset of the plurality of child user task schedules is a first subset of the plurality of child user task schedules, and the machine-executable instructions stored in the memory, in response to execution by the processor, cause the computing device to at least:

delete a second subset of the plurality of child user task schedules from the distributed cache.

11. The system of claim 8, wherein the machine-executable instructions stored in the memory, in response to execution by the processor, cause the computing device to at least:

track a current task progress of a respective task using the machine learning system based at least in part on the event log received from the customer relationship management platform.

12. The system of claim 8, wherein selecting the respective user task schedule having the greatest total task win probability further causes the computing device to at least:

compare a respective total task win probability for each of the plurality of child user task schedules stored in the distributed cache.

13. The system of claim 8, wherein the machine learning system retrieves the task metadata from a scheduling database based at least in part on a task identifier associated with a respective task.

14. The system of claim 8, wherein calculating the plurality of task win probabilities of the plurality of tasks at the respective time slot using the machine learning system further comprises estimating a probability of closing a respective task with a win at the respective time slot.

15. A non-transitory, computer-readable medium comprising machine readable instructions that, when executed by a processor of a computing device, cause the computing device to at least:

train a long short-term memory network of a machine learning system using at least an event log received from a customer relationship management platform;

determine a task success for each of a plurality of previous tasks based at least in part on the event log;

generate a plurality of child user task schedules based at least in part on a first user task schedule from a plurality of user task schedules and a second user task schedule from the plurality of user task schedules, the first user task schedule and the second user task schedule each having a plurality of tasks and each task being assigned a respective time slot;

calculate a plurality of task win probabilities of the plurality of tasks at the respective time slot using the machine learning system, the machine learning system using the long short-term memory network to determine the plurality of task win probabilities based at least in part on task metadata associated with the plurality of tasks;

determine a task progress for each of the plurality of tasks based at least in part on the task metadata;

calculate a plurality of total task win probabilities for the plurality of child user task schedules based at least in part on the plurality of task win probabilities, the task progress for each of the plurality of tasks, and the task success for each of the previous tasks;

determine an optimized user task schedule by selecting a respective user task schedule having a greatest total task win probability from a subset of the plurality of child user task schedules stored in a distributed cache;

transmit the optimized user task schedule to the customer relationship management platform, the optimized user task schedule being accessible for display to a client device via a user interface of the customer relationship management platform; and transmit an alert notification to the client device associated with a user identifier in response to determining the optimized user task schedule, the alert notification indicating the determination of the optimized user task schedule at the customer relationship management platform.

16. The non-transitory, computer-readable medium of claim 15, wherein the subset of the plurality of child user task schedules are stored in the distributed cache based at least in part on a first respective total task win probability of a first child user task schedule being greater than a second respective total task win probability of a second child user task schedule.

17. The non-transitory, computer-readable medium of claim 15, wherein the subset of the plurality of child user task schedules is a first subset of the plurality of child user task schedules, and the instructions, when executed by the processor of the computing device, cause the computing device to at least:

delete a second subset of the plurality of child user task schedules from the distributed cache.

18. The non-transitory, computer-readable medium of claim 15, wherein the instructions, when executed by the processor of the computing device, cause the computing device to at least:

track a current task progress of a respective task using the machine learning system based at least in part on the event log received from the customer relationship management platform.

19. The non-transitory, computer-readable medium of claim 15, wherein selecting the respective user task schedule having the greatest total task win probability further causes the computing device to at least:

compare a respective total task win probability for each of the plurality of child user task schedules stored in the distributed cache.

20. The non-transitory, computer-readable medium of claim 15, wherein training the long short-term memory network comprises generating a plurality of trained parameters for calculating a respective task win probability.

* * * * *